United States Patent
Childers

[15] 3,653,213
[45] Apr. 4, 1972

[54] PLASTIC OIL BARRIER

[72] Inventor: Thomas W. Childers, Woodland Hills, Calif.

[73] Assignee: Esso Production Research Company

[22] Filed: Apr. 22, 1970

[21] Appl. No.: 30,697

[52] U.S. Cl. ...................................................61/1 F
[51] Int. Cl. ...................................................E02b 15/04
[58] Field of Search............61/1, 1 F, 72.1, 72.2, 72.3; 264/174

[56] References Cited

UNITED STATES PATENTS 2,682,151  6/1954  Simpson et al. ...................61/1 F
2,718,684  9/1955  Bjorkstem..........................61/72.2 X
3,546,325  12/1970  Muller................................264/174

Primary Examiner—Peter M. Caun
Attorney—Thomas B. McCulloch, Melvin F. Fincke, John S. Schneider, Sylvester W. Brock, Jr., Kurt S. Myers and Timothy L. Burgess

[57] ABSTRACT

A floatable plastic barrier, molded on-site in a desired shape and secured to an elongated flexible member, is used to contain oil spills in water locations. The flexible member is a cable to which the barrier is bonded directly or attached by clips as the barrier and cable are fed onto the water. The plastic barrier is preferably molded to a 90° "V" shape with the cable formed in or attached to the vertex of the Vee. Vertical drain holes may be punched or drilled at intervals along the length of the barrier to prevent splash from accumulating in the Vee. Mooring lines are attached to the barrier as needed.

6 Claims, 7 Drawing Figures

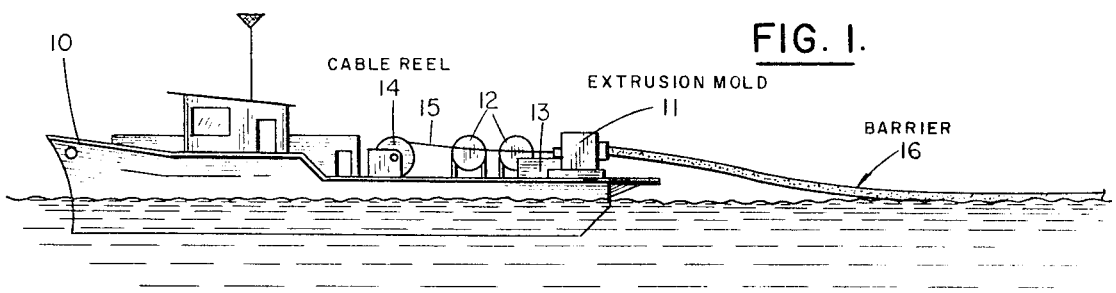
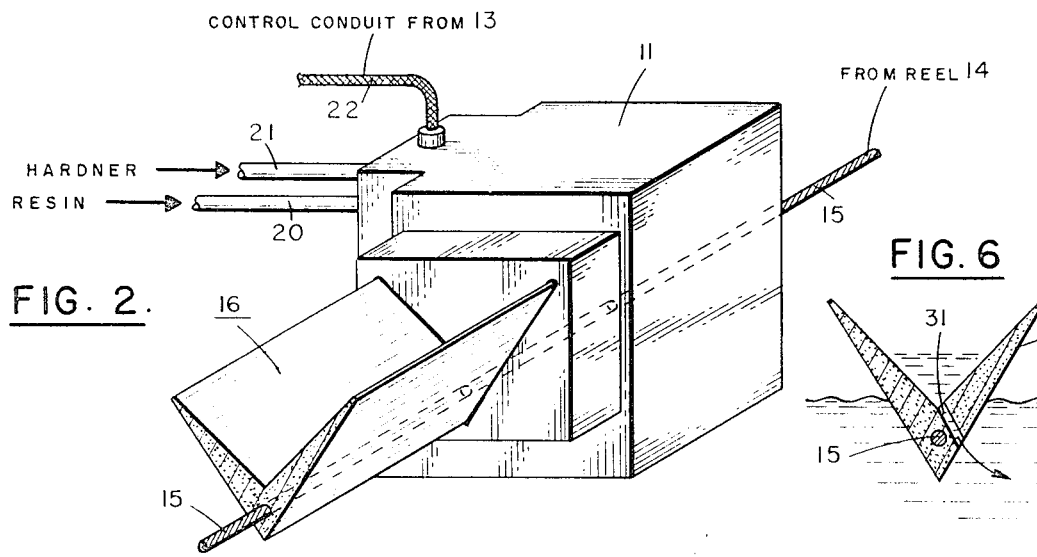
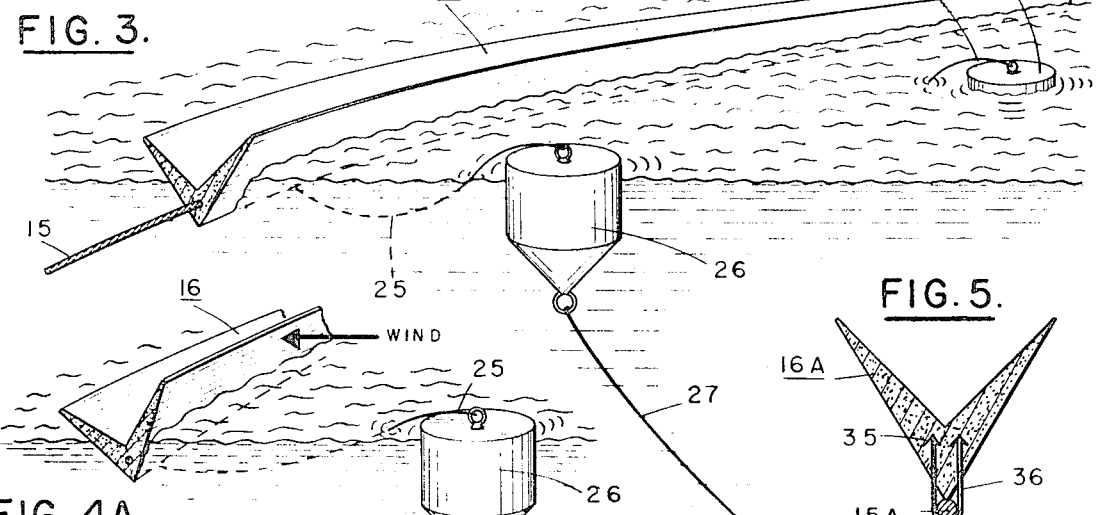
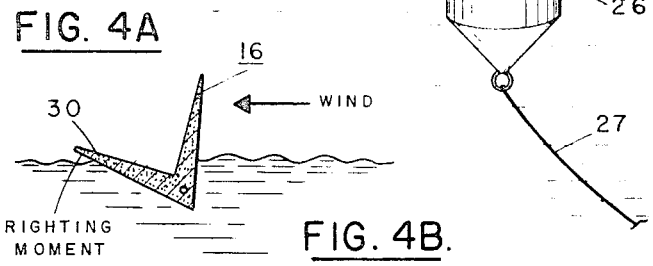

PLASTIC OIL BARRIER

BACKGROUND OF THE INVENTION

The present invention concerns a plastic oil spill barrier. This invention also concerns method and apparatus for forming and installing such barrier.

Various forms of pollution confining fences or barriers for the open seas have been proposed; however, most of these have one or more of the following disadvantages:
1. They are too bulky and difficult to handle;
2. The wind knocks them down and allows oil to spill over;
3. The barrier profile is so low that waves will break over the barrier; or
4. The rigidity of the barrier is such that it cannot conform to the wave and thereby prevent partial submergence or emergence to allow oil to flow over or beneath the barrier.

The present invention overcomes all of these disadvantages.

One aspect of the invention involves an oil spill or pollution barrier for use in open seas comprising a plastic material molded in a desired elongated barrier shape and secured to an elongated supporting member. The plastic material may be premolded and then attached to the supporting member. The shape of the barrier is preferably a 90° "V" with the supporting member positioned at the vertex of the Vee. Another aspect of the invention involves a method of forming an open sea oil spill barrier which comprises continuously molding a floatable plastic material in a selected barrier shape, securing said plastic material to an elongated support member, and feeding said molded plastic material and said attached support member onto open water.

The term "plastic" as used herein applies to flexible materials which can be shaped and then hardened and which are capable of being bonded to the support member. Such materials may be thermoplastic or thermosetting.

BRIEF DESCRIPTION OF THE DRAWINGS

FIG. 1 illustrates formation of the plastic barrier of the invention astern of a vessel;

FIG. 2 illustrates formation of the plastic barrier in greater detail;

FIG. 3 illustrates mooring the plastic barrier to contain an oil spill;

FIGS. 4A and 4B illustrate wind action effect on the plastic barrier;

FIG. 5 illustrates an alternative means for securing the cable to the plastic barrier; and FIG. 6 illustrates a modified plastic barrier.

DESCRIPTION OF THE PREFERRED EMBODIMENTS

Referring to the drawings there is shown in FIG. 1 a vessel 10 on which is positioned molding apparatus including an extrusion mold 11, plastic reservoir tanks 12, and a control system 13. A reel 14 is also positioned on vessel 10. A heavy flexible support cable 15 wound on reel 14 feeds through the extrusion mold 11 in which the cable reinforced plastic barrier, indicated at 16 astern of vessel 10, is continuously formed.

As seen in FIG. 2, extrusion mold 11 is supplied with resin and hardener through conduits 20 and 21, respectively from resin tanks 12 (FIG. 1). A control conduit 22 is used to control the molding operation including regulation of the resin mixture and hardening time. As shown in FIG. 2 the plastic barrier 16 is preferably formed in a 90° "V" shape and molded to cable 15 at the vertex of the Vee. The density of the plastic barrier and support cable is sufficient to buoy the barrier so that the wings of the Vee are supported above the surface of the water approximately one foot with approximately one foot thereof submerged.

As shown in FIG. 3, suitable mooring lines 25 connected to buoys 26 anchored by anchor lines 27 are attached to plastic barrier 16 as needed. These attachments are preferably through a "spring buoy" type system, as shown, to prevent the mooring lines from pulling the barrier under water in strong currents.

The advantages of the 90° Vee shape are illustrated in FIGS. 4A and 4B. The barrier is supported by a righting moment supplied by the leeward wing 30 of the Vee. Vertical drain holes 31 may be punched or drilled at intervals along barrier 16 to prevent splash from accumulating in the trough of the Vee as shown in FIG. 6.

Instead of feeding the cable through the molding apparatus and molding it directly to the plastic material, the cable may be attached to the barrier using barbed clips at spaced apart intervals. Such an arrangement is shown in FIG. 5 where barbs 35 supported on clips 36 secure cable 15A to premolded plastic barrier 16A.

In the event on-site molding is not desired, premolded sections of the plastic barrier to which steel cable or rods are attached using the barbed clips might be used. A quick swivel type connection could be used to connect these sections together. An insert plug could be placed into the trough of the "V" and secured to the barbed clips to seal the junctions.

Polyurethane foams are preferred as the plastic material due to the inherent toughness and flexibility of this plastic and its resistance to hydrocarbons. However, other plastic foams formed by combining two liquid chemical reactants may be used instead. Plastics of this type are easily handled and form in a few minutes following mixing of the desired ingredients. Other examples of moldable materials which might be used to form the barrier include plastics such as epoxies, polypropylenes, polyethylenes, (e.g. polytetrafluoroethylene) nitriles, fluorocarbons, silicones, phenolics, neoprene and butyl rubbers.

Various changes may be made in the embodiments of the invention described herein without departing from the spirit and scope thereof.

Having fully described the nature, objects, advantages, method and apparatus of our invention, we claim:

1. A method for forming an oil spill barrier on a vessel positioned at a water location comprising:
    molding a plastic, floatable when molded, to form a barrier with shape of a "V";
    securing said plastic to an elongated support member at the vertex of said Vee; and
    then feeding said barrier and connected support member from said vessel onto water; the density of the barrier and support member being sufficient to buoy the barrier so that at least a portion of the wings of the "V" extend above the surface of the water when the barrier is floating on the water.

2. A method as recited in claim 1 in which said elongated member is a cable.

3. A method as recited in claim 2 including bonding said plastic directly onto said cable.

4. A method for forming an oil spill barrier on a vessel positioned at a water location comprising:
    molding a plastic to a selected barrier shape, said molded plastic being floatable;
    securing said plastic to a cable support; and
    then feeding said plastic barrier and said connected cable from said vessel onto water, said selected barrier shape being about a 90° "V" and said plastic being directly bonded onto said cable at the vertex of said Vee, said plastic being continuously molded, secured to said cable and fed from said vessel.

5. A method for forming an oil spill barrier on a vessel positioned at a water location comprising:
    molding a plastic to a barrier in the shape of a 90° "V", said molded plastic being floatable;
    securing said plastic to a cable; and
    feeding said barrier and connected cable from said vessel onto said water, said plastic being attached to said cable by means of clips.

6. A method as recited in claim 5 in which said selected barrier shape is a 90° "V" and said cable is positioned at the vertex of said Vee, said plastic being continuously molded, secured to said support member and fed from said vessel.

* * * * *